United States Patent [19]
Johnson

[11] Patent Number: 5,311,384
[45] Date of Patent: May 10, 1994

[54] WIRE TUBING CATCHING MEMBER IS INTEGRAL WITH THE GIMBAL

[75] Inventor: Lyle G. Johnson, Minneapolis, Minn.

[73] Assignee: Seagate Technology, Inc., Scotts Valley, Calif.

[21] Appl. No.: 973,260

[22] Filed: Nov. 9, 1992

[51] Int. Cl.⁵ .......................... G11B 5/60; G11B 5/.48
[52] U.S. Cl. .................................... 360/104; 360/103
[58] Field of Search ................................ 360/103–105

[56] References Cited

U.S. PATENT DOCUMENTS

| | | | |
|---|---|---|---|
| 4,868,694 | 9/1989 | Hagan | 360/104 |
| 5,027,239 | 6/1991 | Hagan | 360/104 |
| 5,079,659 | 1/1992 | Hagan | 360/104 |

Primary Examiner—John H. Wolff
Attorney, Agent, or Firm—Westman, Champlin & Kelly

[57] ABSTRACT

A gimbal tubing capture supports a conductor sleeve as part of a head-gimbal assembly. The gimbal tubing capture includes a capture member extending outward from a side edge of the gimbal. The capture member supports the conductor sleeve in a plurality of directions.

23 Claims, 4 Drawing Sheets

WIRE TUBING CATCHING MEMBER IS INTEGRAL WITH THE GIMBAL

INCORPORATION BY REFERENCE

U.S. Pat. No. 5,027,239, issued to Hagen and assigned to the same assignee as the present invention, is hereby incorporated by reference into the present application.

BACKGROUND OF THE INVENTION

The present invention relates to head-gimbal assemblies for reading and writing magnetically encoded information. In particular, the invention relates to routing and supporting a conductor sleeve running from a head to a support arm of the head-gimbal assembly.

A head-gimbal assembly (HGA) used in a hard disc file includes essentially three components. The first component is a slider which features a self-acting hydrodynamic air bearing and an electromagnetic transducer used for recording and retrieving information from a spinning magnetic disc.

The second component is a gimbal which is attached to the slider. The gimbal is resilient in the slider's pitch and roll directions to allow the slider to follow the topography of the disc over which it is flying. Also, the gimbal is rigid in the in-plane directions for maintaining precise in-plane slider positioning.

The third component is a load beam which is attached to the gimbal and to a support arm. The load beam is typically connected to the support arm by a well-known technique referred to as "swaging" or "ball staking". The load beam is resilient in the vertical direction to allow the slider to follow the topography of the disc. As with the gimbal, the load beam is rigid in the in-plane directions. The load beam also acts as a spring, supplying a downward force that counteracts the hydrodynamic lifting force developed by the air bearing.

Electrical signals are sent to and received from the electromagnetic transducer by very small conductors. The conductors are typically twisted copper wires. There are usually two conductors, but the number of conductors may vary.

These conductors are threaded through a hollow sleeve, typically made of flexible polytetrafloroethylene (PTFE) tubing, to prevent damage to the conductors. Traditionally, this conductor sleeve was routed along the back of the load beam, between two support rails. The tubing would extend to the far end of the gimbal, proximate the electromagnetic transducer, and the conductor wires would then loop over the end of the HGA to termination pads on the slider.

As the physical size of disc files has grown progressively smaller, however, the traditional routing method is no longer feasible. The advent of reverse rail suspensions on modern load beams has necessitated very close back-to-back clearances in order to deflect the load beams and load HGAs into the drives. In fact, to date this has resulted in nearly a 30% reduction in overall disc-to-disc space. In light of this reduction, the conductor sleeve consumes too much space when routed along the back of the load beam. Therefore, a new method for routing the conductor sleeve has become necessary.

Initial attempts to reroute the conductor sleeve along the top surface of the load beam have been largely unsuccessful. Adhesives do not attach well to PTFE. Because PTFE is the preferred material for the conductor sleeve, the use of adhesives to fix the conductor sleeve is difficult. In addition, tacking down both ends of the conductor sleeve to the load beam may lead to undesirable deformation of the sleeve and wire. Temperature changes during cleaning operations or in transit can cause expansion or contraction of the PTFE sleeve. If both ends of the sleeve are secured along the load beam's surface, the conductor sleeve may subsequently stretch or "bow" outward, leading to possible damage to the sleeve or the HGA.

The most serious problem with routing the sleeve along the top of the load beam, however, is the unusually long distance the bare conductor wires must run from the end of the PTFE tubing to the slider assembly. The sharp, etched edges of the HGA could cause damage to the conductor wires. Attempts to tack down the bare wire also pose difficulties with the gimbal's hydrodynamics, as well as its production consistency.

Those skilled in the art are generally reluctant to alter the structure of the gimbal itself. The hydrodynamic characteristics of the gimbal are extremely sensitive, and even the slightest alterations to any part of the assembly can render the HGA inoperable. Therefore, there is a continuing need for effective and efficient methods of routing the conductor sleeve along the HGA, consistent with the present space constrictions and gimbal performance parameters.

SUMMARY OF THE INVENTION

A gimbal tubing capture apparatus of the present invention supports a conductor sleeve running along the side of the gimbal. The conductor sleeve is a hollow length of insulating material, which houses a plurality of conductor wires. A gimbal tubing capture extends from an edge of the gimbal and has a sleeve contact surface for supporting the conductor sleeve.

One embodiment of the present invention includes a side channel system along the load beam. Another embodiment includes a second tubing capture on the support arm to secure the conductor sleeve along the length of the assembly.

DETAILED DESCRIPTION OF THE PREFERRED EMBODIMENTS

Figure 1:
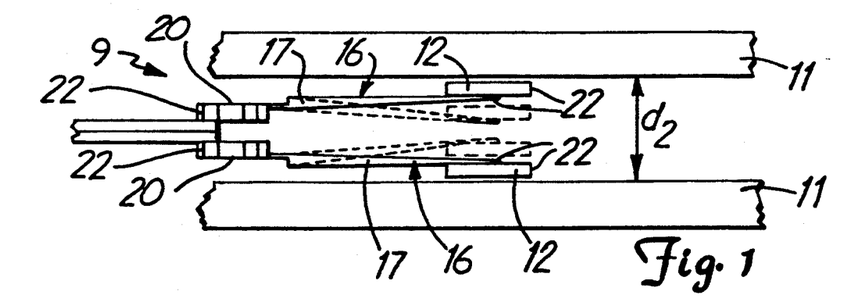
FIG. 1 is a side view of a reverse rail disc drive with reduced back-to-back spacing, with the load/unload position of two HGAs shown in phantom.

FIG. 1 (not to scale) shows disc drive system 9, which includes adjacent discs 11 separated by disc spacing d and adjacent head gimbal assemblies (HGAs) 10. Each HGA 10 includes slider 12, load beam 16, and support arm 20. Conductor wires 22 are shown exiting slider 12 and exiting support arm 20, but are removed at the middle of HGA 10 for clarity. Conductor wires 22 are housed by a hollow conductor sleeve (not shown), made of an insulating material such as PTFE.

Load beam 16 includes support rails 17. Disc-to-disc spacing d is approximately 30 percent (30%) less than in the prior art disc drives. In an effort to meet this increasingly restrictive design constraint, load beam 16 is in a "reverse rail" configuration. In this configuration, support rails 17 now extend from the surface of corresponding load beam 16 toward the surface of disc 11. Reverse rail suspension reduces back-to-back clearance of HGAs 10, such that HGAs 10 may be folded together more compactly during loading or unloading. The loading position of HGAs 10 is shown in phantom.

In the prior art, with substantially greater disc spacing, routing the conductor wires was fairly straightforward. The conductor wires would exit the slider, loop around to the back side of the load beam, and enter the conductor sleeve. The support rails extended from the surface of the load beam away from the surface of the disc. The conductor sleeve ran along the back of the load beam between the support rails, then along the side of the support arm.

To load or unload HGAs 10 into disc drive system 9, HGAs 10 are pushed toward one another as shown in phantom. In the prior art, the conductor sleeve did not interfere with this process because it was between the support rails.

The problem with routing the conductor sleeve that arises from reduced disc spacing d with support rails 17 in a reverse rail configuration is that the conductor sleeve, containing conductor wires 22, can no longer run along the back of load beam 16. Routing the conductor sleeve in this manner would defeat the purpose of reverse rail suspensions by obstructing the tighter back-to-back clearances of loaded HGAs 10. Therefore, an alternative means of routing conductor wires 22 through HGA 10 is desirable.

Figure 2:
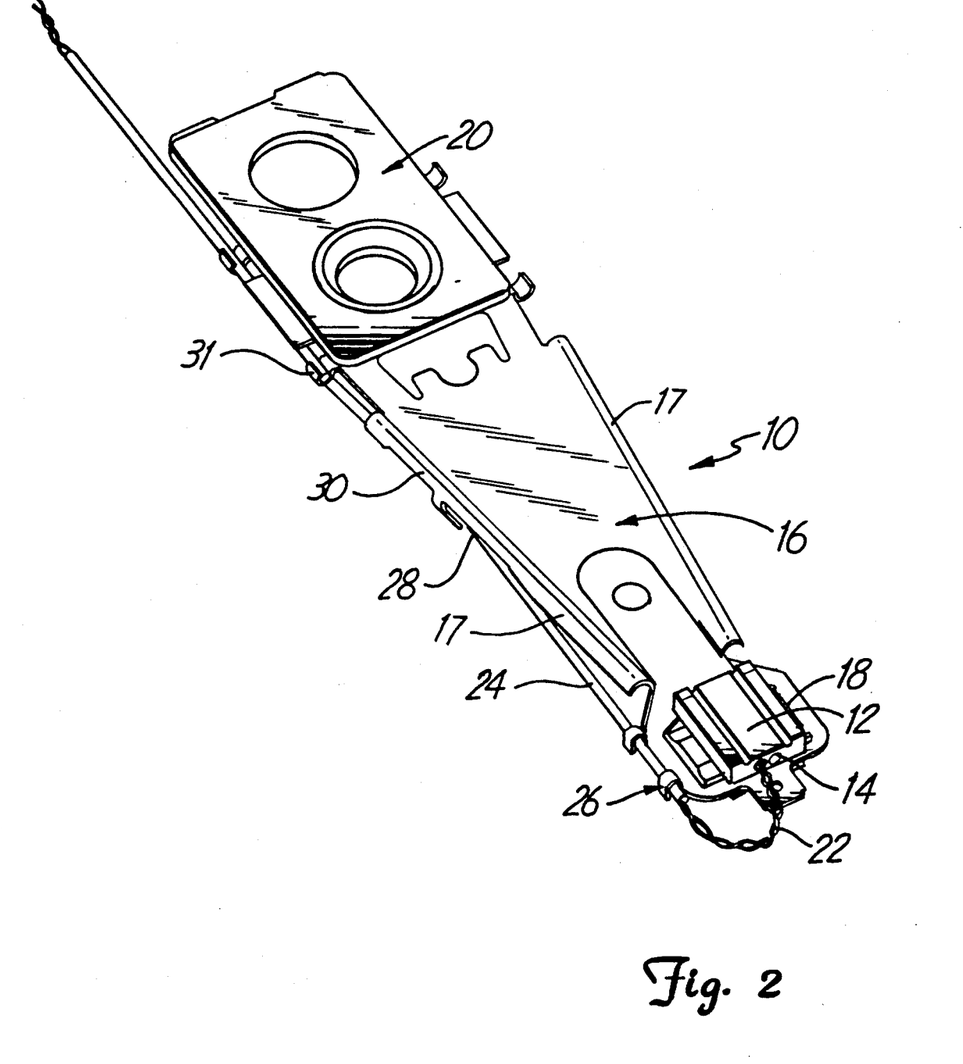
FIG. 2 is a relief view of a head-gimbal assembly (HGA), including a gimbal tubing capture, a side channel system , and a support arm tubing capture.

FIG. 2 shows a preferred embodiment of an improved head-gimbal assembly (HGA) 10 in greater detail. In addition to the components shown in FIG. 1, FIG. 2 shows electromagnetic transducer 14, 90° gimbal 18, gimbal tubing capture 26, conductor sleeve 24, and support arm tubing capture 31.

Slider 12 carries electromagnetic transducer 14 which "flies" over the surface of the disc as the disc rotates. Slider 12 is coupled to load beam 16 by 90° gimbal 18. Load beam 16 is in turn coupled to support arm 20 by a well-known technique referred to as swaging or ball staking. Support arm 20 is coupled to a rotary actuator (not shown) which positions HGA 10 such that slider 12 moves to different radial positions along the disc, permitting reading from or writing to different tracks.

During a read operation, transducer 14 senses changes in magnetic flux as the disc spins below slider 12. This changing magnetic flux creates electrical impulses, which are carried from transducer 14 to control circuitry (not shown) via conductor wires 22. During a write operation the process is reversed, in that the control circuitry sends electrical signals through conductor wires 22 to transducer 14. These electrical signals create changing magnetic flux in a "fringe field" around transducer 14, allowing transducer 14 to impress magnetically encoded information on the surface of the disc.

FIG. 2 also shows a preferred embodiment for routing conductor wires 22. Conductor wires 22 are attached to bonding pads on slider 12 which are, in turn, connected to transducer 14. Conductor wires 22 then loop around the end of HGA 10 and enter conductor sleeve 24. Conductor sleeve 24 is held in place along the edge of gimbal 18 by gimbal tubing capture 26. The inside of support rails 17 form side channels 30, which include side channel exits 28. Conductor sleeve 24 passes through gimbal tubing capture 26 and then through side channel exit 28 and into side channel 30 of load beam 16. Conductor sleeve 24 and conductor wires 22 then pass through support arm tubing capture 31 located along an edge of support arm 20.

By routing conductor sleeve 24 along the side of HGA 10, reduced back-to-back spacing of adjacent HGAs 10 is achieved. In other words, conductor sleeve 24 is no longer in the way when load beams 16 of adjacent HGAs 10 are deflected toward one another as HGAs 10 are loaded onto a disc drive. In addition, the preferred embodiment permits conductor wires 22 to run from transducer 14 to conductor sleeve 24 and remain essentially within a plane defined generally by the surface of gimbal 18. This path for conductor wires 22 eliminates difficulties associated with the prior art, wherein conductor wires 22 were forced to run from transducer 14 and loop over the top of gimbal 18 to enter conductor sleeve 24, which in the past ran along the back of load beam 16. Such a front-to-back loop was prone to potentially serious deformation, ultimately causing conductor wires 22 to hang down and drag on the disc surface. Such dragging would wear down the wires' insulation and cause serious damage to conductor wires 22. No such deformation has been observed when conductor wires 22 form a planar loop from transducer 14 to the side of gimbal 18, as in the present invention.

Figure 3:
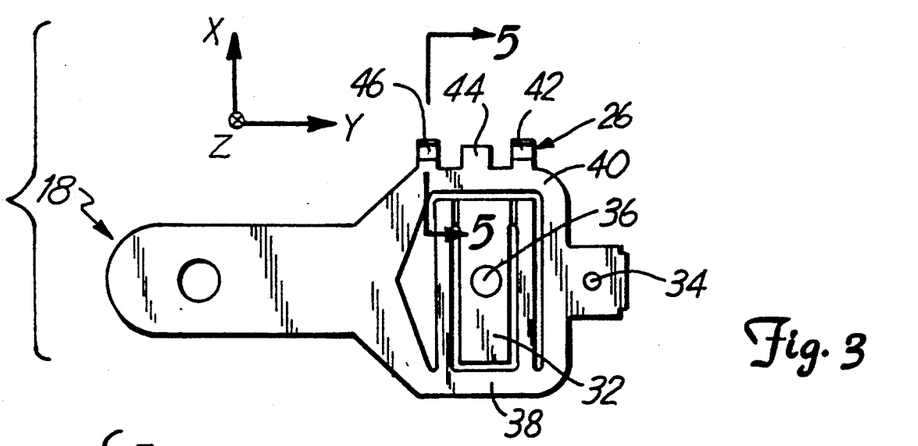
FIG. 3 is a top view of a 90° gimbal.

FIG. 3 shows an enlarged view of 90° gimbal 18 and gimbal tubing capture 26. Gimbal 18 includes two sides 38 and 40 around center line 34, tongue 32, and dimple 36. In the preferred embodiment, gimbal tubing capture 26 includes first capture member 42, second capture member 44, and third capture member 46.

90° gimbal 18 differs from a conventional gimbal in that tongue 32 is perpendicular to center line 34 of gimbal 18. Tongue 32 houses dimple 36 which supports slider 12. In 90° gimbal 18, side 38 and two support struts (not shown) on the back of gimbal 18 provide the main support for tongue 32.

Gimbal tubing capture 26 is typically located along side 40 of gimbal 18, as shown in FIG. 2. In another embodiment, gimbal tubing capture 26 is located on side 38 of gimbal 18. However, because side 38 is attached to the support struts and is directly attached to tongue 32, any longitudinal forces on the tubing can lead to torque on gimbal 18 and create difficulties with the performance of HGA 10. Therefore, it is usually desirable to minimize moments and torque on gimbal 18 by locating gimbal tubing capture 26 on side 40 of gimbal 18.

Figure 4:
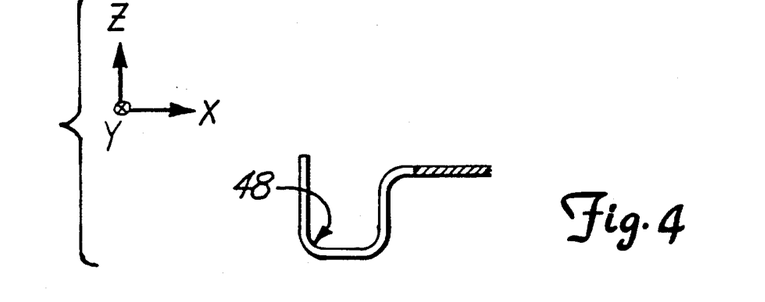
FIG. 4 is a side cross-sectional view of a gimbal tubing capture member.

In FIG. 3, first capture member 42, second capture member 44, and third capture member 46 all protrude outward from side 40 of gimbal 18. In a preferred embodiment, first capture member 42 and third capture member 46 are bracket-shaped or hook-shaped (as shown in FIG. 4, discussed in greater detail below) and second capture member 44 is a flat tab. Those skilled in the art will recognize that a wide variety of shapes, sizes, and configurations of capture members is possible to form gimbal tubing capture 26.

Conductor sleeve 24 is threaded through capture member 42, over second capture member 44, and through third capture member 46. Gimbal tubing capture 26 can be aligned such that conductor sleeve 24 passes straight through all three capture members 42, 44 and 46. Alternatively, first capture member 42 and third capture member 46 may be offset relative to second capture member 44 in a Z direction generally running perpendicular to the surface of gimbal 18, such that conductor sleeve 24 "weaves" through gimbal tubing capture 26. The degree of offset depends on the amount of restraint desired on conductor sleeve 24.

FIG. 4 is a cross-sectional side view of first capture member 42. First capture member 42 includes sleeve contact surface 48 for contacting conductor sleeve 24 (not shown), such that conductor sleeve 24 is supported and restrained in the X and positive Z directions of a plane having X and Y axes generally defining the surface of gimbal 18, with a Z axis running perpendicular to the X and Y axes. In the preferred embodiment, third capture member 46 is identical to first capture member 42. Second capture member 44 is typically a flat tab located between first capture member 42 and third capture member 46, having a sleeve contact surface for supporting and restraining conductor sleeve 24 in the negative Z direction of the plane generally defined by the surface of gimbal 18.

Because gimbal tubing capture 26 does not restrain conductor sleeve 24 axially in the preferred embodiment (i.e., in the Y direction), conductor sleeve 24 can expand or contract during temperature changes without bowing. This prevents undesirable deflection in the Z direction and possible damage to conductor wires 22 or HGA 10 as a result.

If additional axial support is desirable, the "weaving" option with offset capture members 42, 44 and 46 is preferred. Additionally, placement of gimbal tubing capture 26 on side 38 or side 40 of gimbal 18 enables conductor wires 22 to pass directly from conductor sleeve 24 to transducer 14. Therefore, conductor wires 22 never come in contact with any rough edges on the surface of gimbal 18. This helps prevent damage to conductor wires 22.

Figure 5:
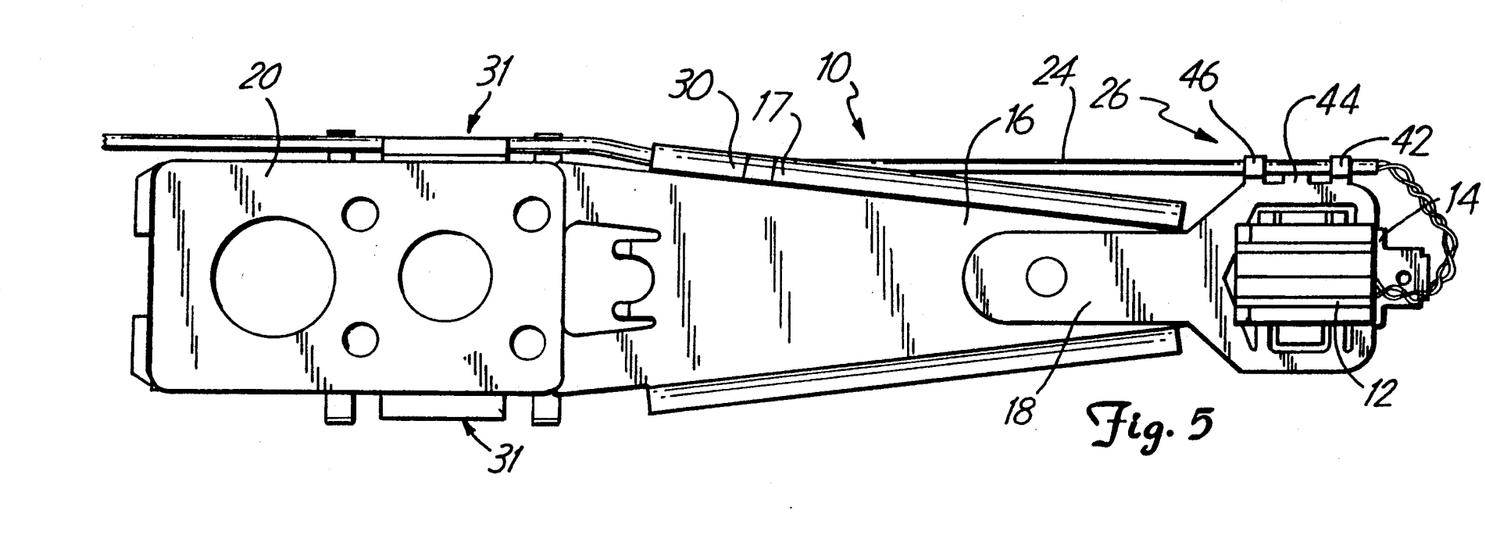
FIG. 5 is a top view of the HGA shown in FIG. 2.

FIG. 5 shows a top view of head-gimbal assembly 10. Conductor sleeve 24 is shown threaded through first capture member 42, along second capture member 44, and through third capture member 46. Conductor sleeve 24 then runs straight from gimbal tubing capture 26 along a line generally defined by first capture member 42, second capture member 44, and third capture member 46 until conductor sleeve 24 reaches load beam 16.

Figure 6:
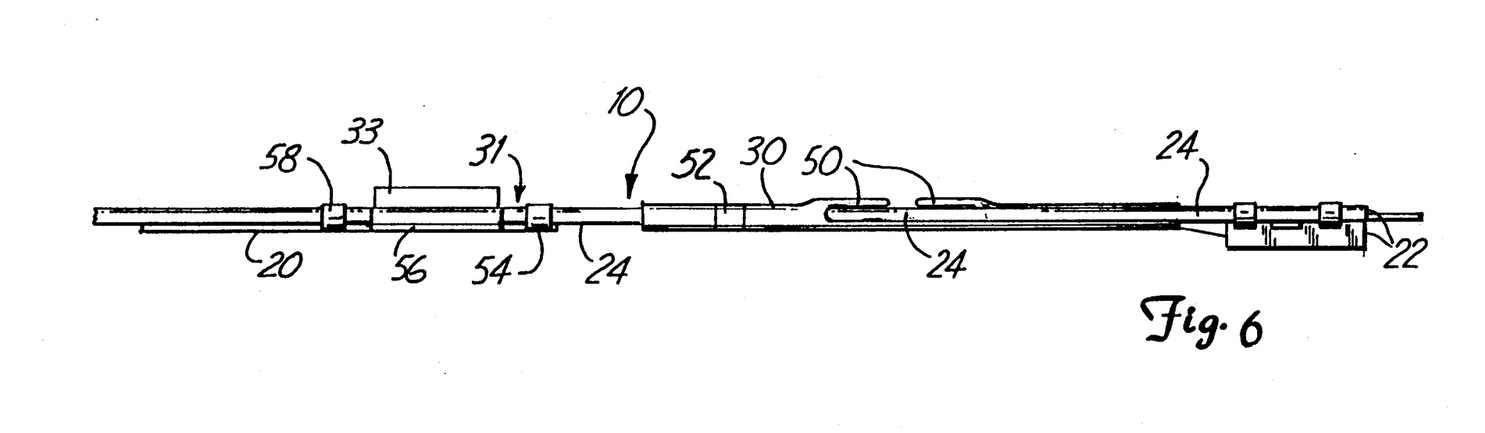
FIG. 6 is a side view of the HGA in FIG. 2.

FIG. 6 is a side view of HGA 10. In addition to the elements described in FIGS. 1-5, this view shows end 33 of load beam 16, guide tabs 50 and fastening tab 52 (in the folded position) along side channel 30. In the preferred embodiment, support arm tubing capture 31 comprises first, second, and third capture members 54, 56, and 58. Conductor sleeve 24 enters side channel 30 in load beam 16 through side channel exit 28. Side channel exit 28 is aligned such that conductor sleeve 24 can enter side channel 30 without changing position in the X or Y directions. Other embodiments may route conductor sleeve 24 directly into side channel 30 at the end 33 of load beam 16. This would eliminate the need for side channel exit 28. However, the preferred embodiment shown in FIGS. 6 and 7 utilizes side channel exit 28 to permit a straight run of conductor sleeve 24 from gimbal 18 to load beam 16. This straight run of conductor sleeve 24 yields less distortion force on gimbal 18.

Conductor sleeve 24 is guided into side channel exit 28 by two guide tabs 50. Conductor sleeve 24 then passes through side channel 30 along the outer edge of load beam 16. Fastening tab 52, which is cut out of a wall of side channel 30, is folded over and crimped onto conductor sleeve 24 during manufacturing to support and restrain conductor sleeve 24 in an axial direction defined generally by the edge of load beam 16. This combination of gimbal tubing capture 26 and securing tab 52 restrains conductor sleeve 24 in the X, Y, and Z directions, yet still allows natural expansion and contraction of conductor sleeve 24 during temperature changes, avoiding the undesirable effects of bowing.

Conductor sleeve 24 then leaves side channel 30. In one preferred embodiment, conductor sleeve 24 travels along the remainder of load beam 16 and enters support arm tubing capture 31 located on a side of support arm 20 adjacent to the side of load beam 16 that conductor sleeve 24 follows.

Support arm tubing capture 31 is similar in construction to gimbal tubing capture 26. In the preferred embodiment, support arm tubing capture 31 includes first capture member 54, second capture member 56, and third capture member 58. First capture member 54 and third capture member 58 of support arm tubing capture 31 have a shape similar to that of first gimbal tubing capture member 42 shown in FIG. 4, but are preferably aligned opposite first capture member 42 and third capture member 46 of gimbal tubing capture 26. That is, if first capture member 42 and third capture member 46 of gimbal tubing capture 26 restrain and support conductor sleeve 24 in the X and positive Z directions, first capture member 54 and third capture member 58 of support arm tubing capture 31 support and restrain conductor sleeve 24 in the X and negative Z directions. Similarly, second capture member 56 of support arm tubing capture 31 has a flat surface like that of second capture member 44 of gimbal tubing capture 26, but second capture member 56 of support arm tubing capture 31 supports and restrains conductor sleeve 24 in the positive Z direction.

As with gimbal tubing capture 26, support arm tubing capture 31 enables conductor sleeve 24 to expand and contract axially during temperature changes. This essentially eliminates problems associated with bowing. If additional axial support is desired, conductor sleeve 24 may be "weaved" through support arm tubing capture 31. Such a support arm capture system is disclosed in the Hagen U.S. Pat. No. 5,027,239.

Figure 7:
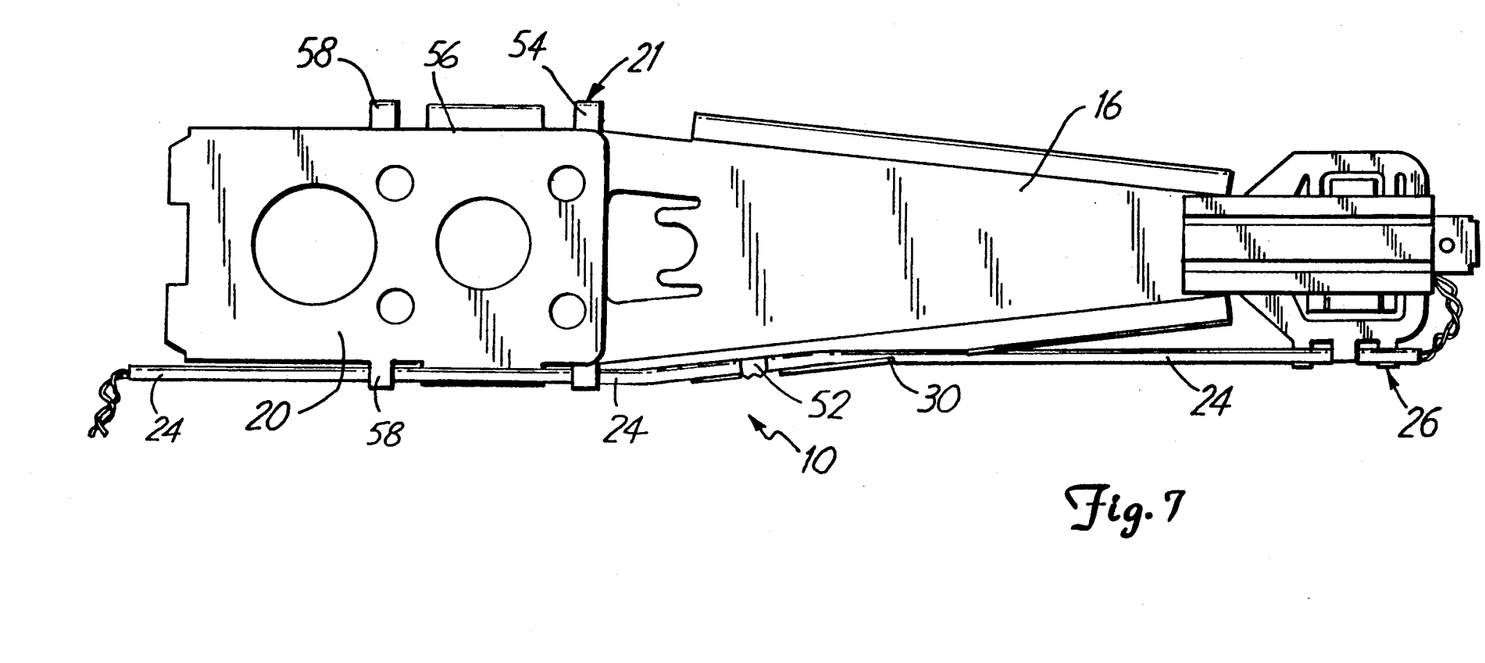
FIG. 7 is a bottom view of the HGA in FIG. 2.

FIG. 7 shows a bottom view of HGA 10. This view clearly illustrates how side channel exit 28 and guide tabs 50 serve to secure conductor sleeve 24 as it is routed along load beam 16. In manufacturing, both sides of load beam 16 are provided with side channels 30, guide tabs 50, and securing tabs 52. Similarly, both sides of support arm 20 have first capture member 54, second capture member 56, and third capture member 58. This symmetry of load beam 16 and support arm 20 allows greater production uniformity, and offers the flexibility of routing conductor sleeve 24 down either side of load beam 16.

The process of assembling conductor sleeve 24 on HGA 10 (as shown in FIGS. 2-7) is greatly simplified over alternative methods of fastening conductor sleeve 24 to HGA 10. First, conductor wires 22 are inserted through conductor sleeve 24 and connected to transducer 14. Sufficient slack is left in conductor wires 22 to allow easy manipulation of conductor sleeve 24 without placing conductor wires 22 under stress at their termination connections.

In the preferred embodiment, conductor sleeve 24 is then threaded through first capture member 42 of gimbal tubing capture 26. Conductor sleeve 24 is next placed on second capture member 44 and slid through third capture member 46 of gimbal tubing capture 26. In one embodiment, this threading step is a straight run for conductor sleeve 24, with no change in position in the Z-direction. In another embodiment, first and third capture members 42 and 44 are offset in the Z direction, such that conductor sleeve 24 is "weaved" through gimbal tubing capture 26.

Conductor sleeve 24 is next threaded through support arm tubing capture 31, in a fashion similar to that described for threading through gimbal tubing capture 26. As with gimbal tubing capture 26, first, second, and third capture members 54, 56, and 58 of support arm tubing capture 31 may be either aligned or offset for a straight run or weave of conductor sleeve 24, respectively. Support arm tubing capture 31 may be located on either side of support arm 20, as shown in FIGS. 6 and 7.

Conductor sleeve 24 is then inserted into side channel 30 and guided through guide tabs 50 and side channel exit 28. Any slack in conductor sleeve 24 is pulled through support arm tubing capture 31 or gimbal tubing capture 26 so that conductor sleeve 24 maintains itself at a generally singular position in the X and Y directions.

Next, the slack in conductor wires 22 is pulled through conductor sleeve 24. This assists conductor wires 22 in maintaining substantially the same position in the Z-direction from transducer 14 to conductor sleeve 24.

A tight, planar loop of conductor wires 22 running from slider 12 to gimbal tubing capture 26 is an improvement over the prior art. In the prior art, conductor wires 22 formed a front-to-back loop from slider 12 to the back of gimbal 18. Conductor wires 22 were prone to deformation which ultimately led to conductor wires 22 dragging on the disc. In another variation of the prior art, conductor wires 22 ran across the top of gimbal 18. That method of routing conductor wires 22 was largely undesirable, as the sharp, etched edges of gimbal 18 can cause serious damage to conductor wires 22. Both of these problems of the prior art are avoided in the present invention.

Finally, fastening tab 52 is folded over conductor sleeve 24 to crimp and restrain conductor sleeve 24 axially. The single crimp supports conductor sleeve 24, yet allows conductor sleeve 24 to expand and contract during temperature changes. This is also an improvement over the prior art, in which multiple crimps or epoxy were used to fasten conductor sleeve 24. Such configurations were prone to "bowing" when conductor sleeve 24 expanded, creating different force distributions and ultimately causing variations to HGA 10. No such bowing difficulties occur with the present invention.

It should be noted that the gimbal tubing capture could comprise one long loop or any number of different-shaped capture members. The conductor sleeve could be made of a variety of materials other than PTFE, and the side channel could have many different cross-sections and tab configurations.

Although the present invention has been described with reference to preferred embodiments, workers skilled in the art will recognize that changes may be made in form and detail without departing from the spirit and scope of the invention.

What is claimed is:

1. A sleeve capture apparatus suitable for use with a gimbal as part of a head-gimbal assembly, the sleeve capture apparatus for supporting and restraining a conductor sleeve running from the gimbal to a support arm along a load beam, the gimbal, the load beam, and the support arm each having a generally planar surface and a plurality of edges defining the generally planar surface, the sleeve capture apparatus comprising:
a first gimbal tubing capture member attached to a first of the plurality of edges of the gimbal, such that the conductor sleeve passes through the first gimbal tubing capture member, and the conductor sleeve is supported proximate the first of the plurality of edges of the gimbal.

2. The apparatus of claim 1, wherein the first gimbal tubing capture member comprises:
a first capture member extending outward from the first of the plurality of edges of the gimbal and having a sleeve contact surface for contacting the conductor sleeve such that the conductor sleeve is supported in a first direction;
and wherein the sleeve capture apparatus further comprises:
a second capture member extending outward from the first of the plurality of edges of the gimbal and having a sleeve contact surface for contacting the conductor sleeve such that the conductor sleeve is supported in a second direction, generally opposite the first direction; and
a third capture extending outward from the first of the plurality of edges of the gimbal such that the second capture member is generally between the first and third capture members along the first of the plurality of edges of the gimbal, the third capture member having a sleeve contact surface for contacting the conductor sleeve such that the conductor sleeve is supported in the first direction.

3. The apparatus of claim 2 wherein the first direction is generally normal to the generally planar surface of the gimbal.

4. The apparatus of claim 2 wherein the sleeve contact surfaces of the first capture member and the third capture member are generally hook-shaped.

5. The apparatus of claim 2 wherein the second capture member has its sleeve contact surface displaced from a line defined generally by the sleeve contact surfaces of the first and third capture members by a distance less than the thickness of the conductor sleeve.

6. The apparatus of claim 1 wherein the gimbal is a 90° gimbal.

7. The apparatus of claim 1 further including a side channel, located along a first of the plurality of edges of the load beam corresponding to the first of the plurality of edges of the gimbal, the side channel comprising:
a sleeve contact surface, for contacting the conductor sleeve such that the conductor sleeve is supported and restrained in a direction defined by the first of the plurality of edges of the load beam.

8. The apparatus of claim 7 wherein the sleeve contact surface of the side channel has a cross-section that is generally U-shaped.

9. The apparatus of claim 8 wherein the side channel has a discontinuity in a portion of the side channel contact surface to form a side channel exit, the discontinuity being located in a side wall defining the first of the plurality of edges of the load beam such that the side channel exit is generally aligned with the first gimbal tubing capture member so the conductor sleeve passes from the gimbal through the side channel exit and into the side channel without becoming substantially non-linear, the side channel exit further comprising:

a plurality of guide tabs for directing and at least partially securing the conductor sleeve into the side channel.

10. The apparatus of claim 9 wherein the side channel exit is located proximate an intersection point of a first line generally defined by the first of the plurality of edges of the gimbal, and a second line generally defined by a center line of the side channel.

11. The apparatus of claim 9, and further comprising:
a securing tab, located along the side channel between the side channel exit and a termination point of the sleeve contact surface, the securing tab supporting and restraining the conductor sleeve in an axial direction defined by a center line of the side channel.

12. The apparatus of claim 1 further comprising:
a support arm tubing capture member attached to the support arm along a first of the plurality of edges of the support arm, such that the conductor sleeve is secured to the first of the plurality of edges of the support arm.

13. The apparatus of claim 12, wherein the support arm tubing capture member comprises:
a first capture member extending outward from the first of the plurality of edges of the support arm and having a sleeve contact surface for contacting the conductor sleeve such that the conductor sleeve is supported in a first direction;
and further comprising:
a second capture member extending outward from the first of the plurality of edges of the support arm and having a sleeve capture surface for contacting the conductor sleeve such that the conductor sleeve is supported in a second direction;
a third capture member extending outward from the first of the plurality of edges of the support arm such that the second capture member is between the first and third capture members along the first of the plurality of edges of the support arm, the third capture member having a sleeve contact surface for contacting the conductor sleeve such that the conductor sleeve is supported in the first direction.

14. An apparatus suitable for coupling a conductor sleeve to a gimbal, having a generally planar surface defined by edges, in a head-gimbal assembly, the apparatus comprising:
a first gimbal tubing capture member formed integrally with a first of the edges of the gimbal such that the conductor sleeve is secured by the first gimbal tubing capture member to the first edge of the gimbal.

15. The apparatus of claim 14, wherein the first gimbal tubing capture member comprises:
a sleeve contact surface for contacting the conductor sleeve such that the conductor sleeve is supported in a first direction;
the apparatus further comprising:
a second gimbal tubing capture member formed integrally with and extending outward from the first edge of the gimbal and having a sleeve contact surface for contacting the conductor sleeve such that the conductor sleeve is supported in a second direction generally opposite the first direction; and
a third gimbal tubing capture member formed integrally with and extending outward from the first edge of the gimbal such that the second capture member is generally between the first and third capture members along the first edge of the gimbal, the third capture member having a sleeve contact surface for contacting the conductor sleeve such that the conductor sleeve is supported in the first direction.

16. The apparatus of claim 15 wherein the first direction is generally normal to the generally planar surface of the gimbal.

17. The apparatus of claim 15 wherein the sleeve contact surfaces of the first capture member and the third capture member have a shape such that the conductor sleeve is supported by each of the first and third capture members in two generally perpendicular directions.

18. The apparatus of claim 14 wherein the gimbal is a 90° gimbal.

19. A head-gimbal assembly suitable for being connected to a support arm for moving the head-gimbal assembly about an axis of rotation in a magnetic recording system wherein information is recorded on and retrieved from a magnetic disc, the head-gimbal assembly comprising:
a slider;
a transducer coupled to the slider, the transducer having two portions coupled to a plurality of electrical conductors;
a hollow conductor sleeve for encasing at least a portion of the electrical conductors;
a gimbal having a generally planar surface and a plurality of edges bounding the generally planar surface;
a plurality of support struts attached to the generally planar surface of the gimbal, the support struts supporting the slider;
a load beam coupled to the gimbal; and
capture means directly attached to a first of the plurality of edges of the gimbal for capturing the conductor sleeve and for supporting the conductor sleeve proximate the first of the plurality of edges of the gimbal.

20. The apparatus of claim 19, wherein the capture means comprises:
a first capture member extending outward from the first of the plurality of edges of the gimbal and having a sleeve contact surface for contacting the conductor sleeve such that the conductor sleeve is supported in a first direction;
a second capture member, extending outward from the first of the plurality of edges of the gimbal and having a sleeve contact surface contacting the conductor sleeve such that the conductor sleeve is supported in a second direction different from the first direction; and
a third capture member, extending outward from the first of the plurality of edges of the gimbal such that the second capture member is between the first and third capture members along the first of the plurality of edges of the gimbal, the third capture member having a sleeve contact surface for contacting the conductor sleeve such that the conductor sleeve is supported in the first direction.

21. The apparatus of claim 20 wherein the first direction is generally normal to the generally planar surface of the gimbal.

22. The apparatus of claim 20 wherein the sleeve contact surfaces of the first capture member and the third capture member have a shape such that the conductor sleeve is supported by each of the first and third capture members in a plurality of directions.

23. The apparatus of claim 19 wherein the gimbal is a 90° gimbal.

* * * * *

UNITED STATES PATENT AND TRADEMARK OFFICE
CERTIFICATE OF CORRECTION

PATENT NO. : 5,311,384
DATED : May 10, 1994
INVENTOR(S) : Lyle G. Johnson

It is certified that error appears in the above-indentified patent and that said Letters Patent is hereby corrected as shown below:

Column 8, line 59, cancel "8" and insert --7--.

Signed and Sealed this

Eighteenth Day of October, 1994

Attest:

BRUCE LEHMAN

*Attesting Officer*    *Commissioner of Patents and Trademarks*